(12) United States Patent
Tedeschini et al.

(10) Patent No.: US 11,421,740 B2
(45) Date of Patent: *Aug. 23, 2022

(54) ENCODER WHEEL FOR WHEEL HUB ASSEMBLY

(71) Applicant: Aktiebolaget SKF, Gothenburg (SE)

(72) Inventors: Luca Tedeschini, Turin (IT); Daniele Duch, San Gillio (IT)

( * ) Notice: Subject to any disclaimer, the term of this patent is extended or adjusted under 35 U.S.C. 154(b) by 52 days.

This patent is subject to a terminal disclaimer.

(21) Appl. No.: 16/024,996

(22) Filed: Jul. 2, 2018

(65) Prior Publication Data

US 2019/0024720 A1 Jan. 24, 2019

(30) Foreign Application Priority Data

Jul. 24, 2017 (IT) .................... 102017000083818

(51) Int. Cl.
| | | |
|---|---|---|
| *G01P 3/44* | (2006.01) | |
| *F16C 41/00* | (2006.01) | |
| *G01P 3/487* | (2006.01) | |
| *F16C 33/58* | (2006.01) | |
| *B60B 27/00* | (2006.01) | |
| *F16C 19/18* | (2006.01) | |
| *H01F 1/08* | (2006.01) | |

(52) U.S. Cl.
CPC ........ *F16C 41/007* (2013.01); *B60B 27/0005* (2013.01); *F16C 33/586* (2013.01); *G01P 3/443* (2013.01); *G01P 3/446* (2013.01); *G01P 3/487* (2013.01); *F16C 19/185* (2013.01); *F16C 2326/02* (2013.01); *H01F 1/083* (2013.01)

(58) Field of Classification Search
CPC .. F16C 41/007; F16C 19/185; F16C 2326/02; F16C 33/586; G01P 3/443; G01P 3/446; G01P 3/487; B60B 27/0005; H01F 1/083
See application file for complete search history.

(56) References Cited

U.S. PATENT DOCUMENTS

| | | | | |
|---|---|---|---|---|
| 4,932,245 A | * | 6/1990 | Shelton | .................... G01P 3/443 |
| | | | | 324/173 |
| 4,969,753 A | * | 11/1990 | Kato | .................... B60B 27/0068 |
| | | | | 384/448 |
| 6,190,051 B1 | | 2/2001 | Angelo et al. | |

(Continued)

FOREIGN PATENT DOCUMENTS

| | | |
|---|---|---|
| CN | 140907097 | 9/2003 |
| CN | 1573150 | 2/2005 |

(Continued)

OTHER PUBLICATIONS

Office Action for corresponding Chinese application No. 201810777047.7 dated Jul. 26, 2021.

*Primary Examiner* — Alexander A Mercado

(74) *Attorney, Agent, or Firm* — Reed Smith LLP

(57) ABSTRACT

A speed measuring device for a wheel hub assembly equipped with a rolling bearing. The measuring device having an encoder wheel mounted on a rotating ring of the bearing, a mechanical support disposed between the encoder wheel and the ring to cause the encoder wheel and the ring to be angularly fixed to one another, and a mechanical lock for axially locking the encoder wheel in a seat formed by the mechanical lock together with the mechanical support. The encoder wheel is equipped with a base structure made of plastic material mounted in a seat.

13 Claims, 1 Drawing Sheet

(56) References Cited

U.S. PATENT DOCUMENTS

| | | |
|---|---|---|
| 6,323,640 B1 | 11/2001 | Forestiero et al. |
| 6,857,782 B2 * | 2/2005 | Norimatsu ............... B60B 27/00 |
| | | 384/448 |
| 7,374,343 B2 * | 5/2008 | Nakajima ........... F16C 33/7879 |
| | | 324/174 |
| 10,459,000 B2 * | 10/2019 | Duch ....................... B60T 8/329 |
| 2003/0053726 A1 * | 3/2003 | Norimatsu ............... B60B 27/00 |
| | | 384/448 |
| 2003/0059139 A1 * | 3/2003 | Nakajima ........... F16C 33/7879 |
| | | 384/448 |
| 2004/0179760 A1 | 9/2004 | Nakajima et al. |
| 2005/0007226 A1 * | 1/2005 | Mizuta ................ F16C 33/7879 |
| | | 335/207 |
| 2006/0049821 A1 | 3/2006 | Fayaud et al. |
| 2006/0170414 A1 * | 8/2006 | Vignotto ................. G01P 3/443 |
| | | 324/174 |
| 2007/0152657 A1 * | 7/2007 | Yabe ..................... F16C 19/186 |
| | | 324/174 |
| 2010/0007450 A1 | 1/2010 | Mizuta |
| 2018/0335442 A1 * | 11/2018 | Duch ................. G01D 5/24442 |

FOREIGN PATENT DOCUMENTS

| | | |
|---|---|---|
| CN | 1645058 | 7/2005 |
| CN | 1696706 | 11/2005 |
| CN | 1818566 | 8/2006 |
| CN | 101040130 | 9/2007 |
| CN | 101392792 | 3/2009 |
| CN | 101490432 | 7/2009 |
| CN | 101755139 | 6/2010 |
| CN | 102483094 | 5/2012 |
| CN | 102483095 | 5/2012 |
| CN | 102562814 | 7/2012 |
| CN | 102893163 | 1/2013 |
| EP | 1674872 | 6/2006 |

* cited by examiner

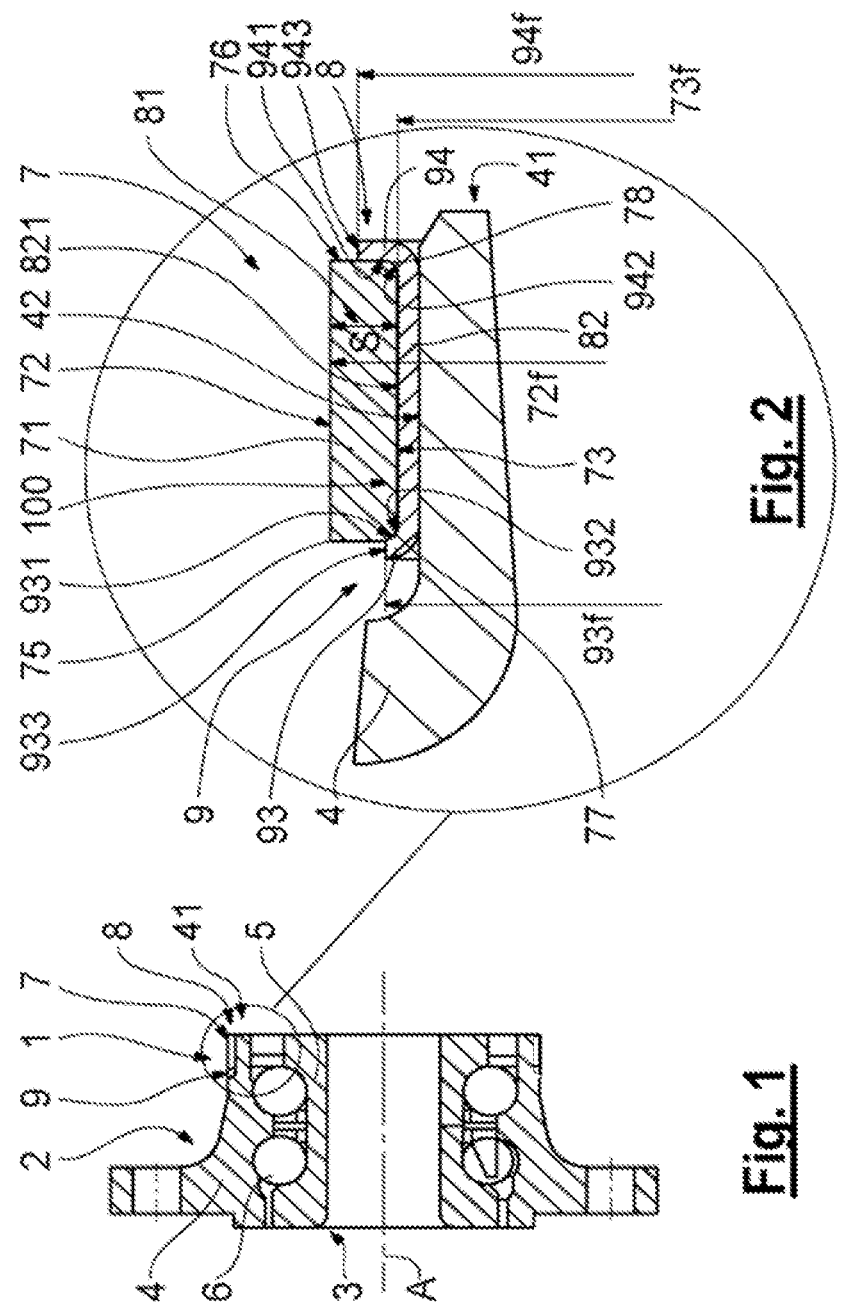

ENCODER WHEEL FOR WHEEL HUB ASSEMBLY

CROSS-REFERENCE

This application claims priority to Italian patent application no. 102017000083818 filed on Jul. 24, 2017, the contents of which are fully incorporated herein by reference.

TECHNOLOGICAL FIELD

The present invention relates to an encoder wheel for a wheel hub assembly.

The present invention is particularly, although not exclusively, applicable to the field of wheel hub assemblies with rolling bearings for motor vehicles. These applications include both the case in which the outer ring of the bearing is rotating while the inner ring of the bearing is fixed and the opposite case in which the inner ring rotates and the outer ring is fixed. The encoder wheel forms part of a device for measuring the rotation speed of the rotating ring of the bearing. These devices also comprise a sensor, usually a revolution sensor, capable of acquiring a signal generated by the encoder wheel, enabling it to monitor the kinematic operating parameters of the wheel hub assembly. The following description will refer, by way of example, to these specific applications, without thereby losing its generality.

BACKGROUND

Speed measuring devices of known types comprise an encoder wheel which usually takes the form of an annular disc or a cylindrical shield and comprises a base structure made of rubber material and of a ferromagnetic material, preferably in powder form, embedded in the base structure, and a metal support which is fixed to the magnetized rubber portion and is force-fitted on to the rotating ring of the bearing or on to an element fixed thereto.

In encoder wheels of the type described above, the base structure is fixed to the metal support by vulcanizing the rubber material on the metal support itself, and, in this second case, the encoder wheel is magnetized simultaneously with the vulcanization in order to impart the magnetic characteristics to it. The encoder wheel is magnetized by subjecting the ferromagnetic material to a magnetic field so as to orientate the ferromagnetic material along predetermined lines of flux, and it has been found that the magnetic characteristics of encoder wheels in which the base structure is made of rubber material are not very high, owing to the resistance to the movement of the ferromagnetic material within the rubber material.

Alternatively, use may be made of the specific elastic characteristics of rubber materials which allow them to undergo considerable deformation without permanent alteration and/or damage, by deforming the base structure elastically so that it can be fitted on to the metal support after being magnetized separately. In this case, since the elastic recovery of the base structure on to the metal support is not sufficient to make the two elements angularly fixed to one another, encoder wheels are fixed to the metal support by adhesive bonding, and, in addition to the problem of the resistance of the ferromagnetic material in the base structure described above, they also become subject to tensile stress, due to the elastic stress that they undergo during coupling, or due to the adhesive bonding, and these tensile stresses reduce the quality and duration of their signal.

SUMMARY

The object of the present invention is to provide an encoder wheel for a wheel hub assembly which is free of the drawbacks described above.

According to the present invention, an encoder wheel for a wheel hub assembly with a rolling bearing is provided, having the characteristics stated in the attached independent claim.

Further preferred and/or particularly advantageous embodiments of the invention are described according to the characteristics stated in the attached dependent claims.

BRIEF DESCRIPTION OF THE DRAWINGS

The invention will now be described with reference to the attached drawings, which show a non-limiting example of embodiment thereof, in which:

FIG. 1 is a partial cross section of a wheel hub assembly equipped with a speed measuring device according to the invention, with a radial encoder wheel mounted on the outer ring of the bearing; and FIG. 2 is a view on an enlarged scale of the radial encoder wheel of FIG. 1.

DETAILED DESCRIPTION

With reference to FIG. 1, the number 1 indicates the whole of a speed measuring device for a wheel hub assembly 2. The assembly 2 is equipped with a rolling bearing 3 comprising an outer ring 4, coaxial with an axis A of rotation of the bearing 3, an inner ring 5 coaxial with the outer ring 4, and a plurality of rolling means 6, for example balls, interposed between the outer ring and inner ring. In the example proposed in FIG. 1, the outer ring 4 of the bearing 3 is rotating, while the inner ring 5 is fixed.

The bearing 3 is equipped with a device 1 for measuring the rotation speed of the outer rotating ring 4; this device 1 comprises:

a radial encoder wheel 7, mechanical supporting means 8 interposed between the encoder wheel 7 and the outer ring 4 to support the encoder wheel 7 and cause it to be angularly fixed to the outer ring 4;

mechanical locking means 9 for axially locking the encoder wheel 7 on to the mechanical supporting means 8; and a sensor (not shown) facing the encoder wheel and mounted on a fixed part of the vehicle.

As also shown in FIG. 2, the mechanical supporting means 8 are mounted directly on the axially outer side 41 of the outer ring 4 and comprise a cylindrical bottom wall 82, which is keyed in an axially adjustable way on to an outer cylindrical surface 42 of the outer ring 4, is coaxial with the axis A, and is radially delimited externally by a cylindrical bottom surface 821.

The mechanical locking means 9 are associated with the mechanical supporting means 8 to lock the encoder wheel 7 axially on to the mechanical supporting means 8, and comprise a narrow lateral wall or flange 93 and an extended lateral wall or flange 94, which are fixed at opposite ends to the cylindrical bottom wall 82 and extend radially outwards from the cylindrical bottom wall 82: the lateral walls or flanges 93 and 94 are mechanical locking means of the encoder wheel 7 and lock the encoder wheel 7 axially on to the cylindrical bottom wall 82. The narrow lateral wall or flange 93 is positioned axially at the opposite end from the axially outer side 41 of the outer ring 4 relative to the cylindrical bottom wall 82, and is radially delimited externally by a cylindrical surface 933 having a diameter 93*f* smaller than a diameter 94*f* of a radially outer cylindrical surface 943 of the extended lateral wall or flange 94, which is positioned on the same side as the axially outer side 41 of the outer ring 4. The lateral walls or flanges 93 and 94 are also axially delimited on their sides facing the cylindrical bottom wall by respective surfaces 931 and 941 transverse to the axis A and joined to the cylindrical bottom surface 821 by respective toroidal joints 932 and 942.

The lateral walls or flanges 93 and 94, together with the cylindrical bottom wall 82, are made of metallic material and form between them a U-shaped metal insert 81 as well as a seat 100 for the encoder wheel 7: if both the lateral walls or flanges 93 and 94 prevent any axial movement of the encoder wheel 7 relative to the cylindrical bottom wall 82, the radial height of the lateral walls or flanges 93 and 94 causes the lateral wall or flange 93 to have a further function, different from that of the lateral wall or flange 94. To explain further, the lateral wall or flange 93 allows the encoder wheel 7 to be inserted into the seat 100, while the lateral wall or flange 94 allows the encoder wheel 7 to be mounted on the surface 42 with the aid of pushing means (not shown) which apply an axial mounting force to the lateral wall or flange 94 without acting on the encoder wheel 7, which is therefore protected, at least during its mounting on the bearing 3. The lateral wall or flange 94 is also capable of protecting the encoder wheel 7 during the operation of the measuring device, 1 by preventing any impact on the encoder wheel 7 by external elements and/or by the bearing 3, and/or by the measuring device 1.

The encoder wheel 7 comprises a base structure 71 made of plastic material and a ferromagnetic material, preferably in powder form, embedded in the base structure 71 and magnetized with alternating polarities in the circumferential direction. The base structure 71 is radially delimited externally by a reading surface 72 and internally by a mounting surface 73: both the surfaces 72 and 73 are cylindrical surfaces, and the reading surface 72 has a diameter 72*f* which is greater than both the diameter 93*f* and the diameter 94*f*, while the mounting surface 73 is positioned in contact with the surface 821 and has a diameter 73*f* which is slightly smaller than the diameter 93*f*.

The plastic material, which for simplicity will be referred to hereafter as either magnetized plastic material or magnetized plastic, from which the base structure 71 is made does not have a high elasticity, but the difference between the diameter 73*f* and the diameter 93*f* has been made great enough to allow the base structure 71 to expand, preferably radially, behind the lateral wall or flange 93 to a sufficient degree to allow the encoder wheel 7 to pass over the lateral wall or flange 93 in the axial direction during assembly, and to be fitted into the seat 100 without any damage, especially if the base structure 71 is inserted in the hot state in this phase of assembly. Additionally, the difference between the diameter 73*f* and the diameter 93*f* has been established in such a way that the lateral wall or flange 93 forms an effective axial stop for the encoder wheel 7, once the latter has been inserted into the seat 100.

In other words, during assembly, the encoder wheel 7 is forced on to the lateral wall or flange 93 and is mechanically caused to expand, allowing the diameter 73*f* of the mounting surface 73 to become similar or substantially greater than the diameter 93*f* of the lateral wall or flange 93, thus allowing the base structure 71 to be inserted into the seat 100 by passing over the lateral wall or flange 93 without difficulty.

Although made of plastic material, the base structure 71 has a very small degree of elasticity which allows it to pass over the lateral wall or flange 93 and to return, when it is in the seat 100, to its nominal dimensions, that is to say the dimensions that bring the surface 73 into direct and close contact with the surface 821, creating frictional conditions such that the encoder wheel 7 and the wall 82 are angularly fixed to one another. The elastic recovery of the base structure 71 of plastic material presses the base structure 71 radially against the wall 82, and since the wall 82 is, in turn, keyed on to the outer cylindrical surface 42 of the outer ring 4, it causes the encoder wheel 7 to be angularly fixed to the outer ring 4 simply as a result of the frictional forces generated by the surfaces in contact between the encoder wheel 7 and the wall 82, and between the wall 82 and the outer ring 4.

If the base structure 71 is also inserted in the hot state into the seat 100, its expansion due to heating allows it to pass over the lateral wall or flange 93 without any difficulty, and the subsequent cooling to ambient temperature allows it to return to its nominal dimensions when it is in the seat 100.

Preferably, in order to cause the encoder wheel 7 to be angularly fixed more firmly to the outer ring 4, an adhesive is used between the two elements to prevent any relative movement thereof even in the most critical operating conditions.

Finally, the encoder wheel 7 has rounded annular edges 77 and 78 at the toroidal joints 932 and 942, so as to copy the shape of the toroidal joints 932 and 942, and so as to facilitate the operations of assembling the base structure 71 in the seat 100. The rounded angular edges 77 and 78 also prevent the formation of any fractures and/or cracks in the base structure 71, and, finally, also allow optimal centering of the encoder wheel 7 in the seat 100.

Lastly, it should be noted that the base structure 71 has a radial thickness S which is markedly greater than the difference between the diameter 93*f* and the diameter 73*f*, so that the mounting of the encoder wheel 7 in the seat 100 is made even more secure, that is to say free of defects. By way of non-limiting example, a thickness S equal to at least 4 or 6 times the difference between the diameter 93*f* and the diameter 73*f* makes the mounting of the encoder wheel 7 in the seat 100 absolutely secure and free of contraindications.

Finally, by making the encoder wheel 7 with a base structure 71 of plastic material it is possible to overcome the drawbacks described above which are typical of encoder wheels made of rubber.

The mechanical supporting means 8 and the mechanical locking means 9 of the present invention have a number of technical advantages, for example:

the possibility of mounting the encoder wheel 7 on the surface 42 of the outer ring 4 while adjusting the axial position of the encoder wheel 7, even during the final assembly of the wheel hub assembly 2 on to the vehicle, compensating for any errors of alignment of the encoder wheel 7 relative to the sensor; and the possibility of protecting the base structure 71 from any impact, especially during assembly with the bearing 3.

However, the major advantage of the mechanical locking means 9 of the present invention is the fact that the lateral walls or flanges 93 and 94 differ in size from one another, and both differ from the encoder wheel 7. Indeed, the particular reduction in size of the lateral wall or flange 93 relative to a radial thickness of the base structure 71 leaves a lateral edge 75 of the encoder wheel 7 substantially exposed, thus facilitating the diffusion of the magnetic field generated by the magnetized plastic of the base structure 71 in the vicinity of the base structure 71.

On the axially opposite side, the reduction in size of the lateral wall or flange 94 relative to the radial thickness of the base structure 71 leaves a portion of a lateral edge 76 sufficiently exposed to allow good diffusion of the magnetic field generated by the magnetized plastic, while simultaneously protecting the lateral edge 76 during the mounting of the encoder wheel 7 on to the rotating outer ring 4. The greater diffusion of the magnetic field generated by the magnetized plastic of the base structure 71 both from the part facing the axially outer side 41 of the outer ring 4 and, especially, from the part facing the side axially opposed to the axially outer side 41, increases the freedom of the axial mounting of the device 1 for measuring the rotation speed of the outer rotating ring 4, facilitating the compensation of any errors in the axial mounting or in the mounting of the sensor or of the encoder wheel 7, without detracting from the quality of the magnetic signal that can be received by the sensor.

Additionally, the particular reduction in the size of the lateral wall or flange 93 relative to the radial thickness of the base structure 71 facilitates the mounting of the encoder wheel 7 in the seat 100 without any damage to the encoder wheel 7, simply by making use of the elasticity of the magnetized plastic, although this elasticity is small.

It should be appreciated that there are numerous further variants of the invention, in addition to the embodiment described above. It should also be appreciated that the embodiment is described purely by way of example and does not limit the object of the invention or the applications or possible configurations thereof. On the contrary, although the above description enables those skilled in the art to apply the present invention at least in an exemplary configuration thereof, it should be appreciated that it would be feasible to vary the components described in numerous ways without departing from the object of the invention as defined in the attached claims, interpreted literally and/or according to their legal equivalents.

What is claimed is:

1. A rotating speed measuring device for a hub of a vehicle wheel comprising a rolling bearing having an inner ring and a rotating outer ring, the measuring device comprising:
    a radial encoder wheel assembled on an outer cylindrical surface of the rotating outer ring of the rolling bearing, the radial encoder wheel comprising;
    a base structure made of magnetized plastic;
    a seat defining a cylindrical surface that radially supports the base structure such that the base structure is angularly fixed to the seat, the seat comprising an axially inner first lateral wall and an axially outer second extended lateral wall disposed axially distally from the first lateral wall relative to the cylindrical surface,
        wherein a radial thickness of the base structure is greater than the difference between a first radius defined by the axially outer second extended lateral wall and a second radius defined by the axially inner first lateral wall, wherein the first lateral wall and the second extended lateral wall differ in size from one another, the axially outer second extended lateral wall comprises a reduced size relative to the radial thickness of the base structure such that a second lateral edge of the base structure is exposed, and the axially inner first lateral wall comprises a reduced size relative to the radial thickness of the base structure such that a first lateral edge of the base structure is substantially exposed;
    a mechanical support disposed between the encoder wheel and the rotating outer ring, wherein, the encoder wheel and the rotating outer ring are angularly fixed with each other, the mechanical support having a first end adjacent to an axial outer side of the rotating outer ring; and
    a first radial extension extending radially from the first end of the mechanical support and a second radial extension extending radially from the mechanical support at a second end axially inward on the outer ring relative to the first end, the first radial extension extending radially further than the second radial extension.

2. The rotating speed measuring device according to claim 1, wherein,
    the mechanical support comprises a cylindrical bottom wall that is fixed in an axially adjustable fashion on the rotating outer ring, and
    the base structure is configured to directly contact the cylindrical bottom wall and is angularly fixed to the cylindrical bottom wall.

3. The rotating speed measuring device according to claim 2, wherein,
    the first radial extension and the second radial extension are combined with the mechanical support to axially lock the encoder wheel in the mechanical support,
    the first lateral wall of the first radial extension and the second lateral wall of the second radial extension comprise two lateral flanges that are jointed to the cylindrical bottom wall, and
    the two lateral flanges and the cylindrical bottom wall being made in one piece and, of metallic material, and defining a U-shaped insert that forms the seat.

4. The rotating speed measuring device according to claim 3, wherein the two lateral flanges comprises a first lateral flange and a second lateral flange, the first lateral flange is a flange whose radial dimensions are reduced with respect to the radial dimensions of a second lateral flange; the second lateral flange being a pushing lateral flange configured to shield the encoder wheel at least during the mounting of the rotating speed measuring device onto the rotating outer ring.

5. The rotating speed measuring device according to claim 4, wherein the encoder wheel has inner radial dimensions that are less than outer radial dimensions of the lateral flanges.

6. The device of claim 1, wherein the radial thickness of the base structure is constant.

7. A radial encoder wheel, comprising:
    a base structure made of magnetized plastic;
    a seat defining a cylindrical surface that radially supports the base structure such that the base structure is angularly fixed to the seat, the seat comprising an axially inner first lateral wall and an axially outer second extended lateral wall disposed axially distally from the first lateral wall relative to the cylindrical surface,
        wherein a radial thickness of the base structure is greater than the difference between a first radius defined by the axially outer second extended lateral wall and a second radius defined by the axially inner first lateral wall, wherein the first lateral wall and the second extended lateral wall differ in size from one another, the axially outer second extended lateral wall comprises a reduced size relative to the radial thickness of the base structure such that a second lateral edge of the base structure is exposed, and the axially inner first lateral wall comprises a reduced size relative to the radial thickness of the base structure such that a first lateral edge of the base structure is substantially exposed.

8. The encoder wheel of claim 7, further comprising:
an outer ring of a wheel hub assembly, wherein the encoder wheel is disposed on the outer ring such that the base structure is further angularly fixed to the outer ring.

9. The encoder wheel of claim 7, wherein the first radius is larger than the second radius.

10. The encoder wheel of claim 7, wherein the axially outer second extended lateral wall is nearer an axially outer side of the outer ring relative to the axially inner first lateral wall.

11. A rolling bearing for a hub of a vehicle wheel the rolling bearing, comprising:
an inner ring;
a rotating outer ring defining an axially inner side and an axially outer side; and
a rotating speed measuring device mounted on the rotating outer ring, the rotating speed measuring device comprising:
a radial encoder wheel, comprising:
a base structure made of magnetized plastic, the radial encoder wheel assembled on the rotating outer ring;
a seat defining a cylindrical surface that radially supports the base structure such that the base structure is angularly fixed to the seat, the seat comprising an axially inner first lateral wall and an axially outer second extended lateral wall disposed axially distally from the first lateral wall relative to the cylindrical surface,
wherein a radial thickness of the base structure is greater than the difference between a first radius defined by the axially outer second extended lateral wall and a second radius defined by the axially inner first lateral wall, wherein the first lateral wall and the second extended lateral wall differ in size from one another, the axially outer second extended lateral wall comprises a reduced size relative to the radial thickness of the base structure such that a second lateral edge of the base structure is exposed, and the axially inner first lateral wall comprises a reduced size relative to the radial thickness of the base structure such that a first lateral edge of the base structure is substantially exposed.

12. The rotating speed measuring device of claim 11, wherein the first radius is larger than the second radius.

13. A rolling bearing for a hub of a vehicle wheel the rolling bearing, comprising:
an inner ring;
a rotating outer ring defining an axially inner side and an axially outer side; and
a rotating speed measuring device mounted on the rotating outer ring, the rotating speed measuring device comprising:
an encoder wheel comprising a base structure made of magnetized material, the encoder wheel assembled on the rotating outer ring of the rolling bearing; and
a cylindrical seat disposed between the encoder wheel and an outer cylindrical surface of the rotating outer ring, wherein the encoder wheel and the cylindrical seat are angularly fixed with each other,
wherein the cylindrical seat includes an axially inner first lateral wall having a first radial dimension less than a second radial dimension of an axially outer second lateral wall, wherein the first lateral wall and the second lateral wall differ in size from one another, the first lateral wall comprises a reduced size relative to the radial thickness of the base structure such that a lateral edge of the base structure is exposed, wherein the axially inner first lateral wall is relatively proximate to a roller of the roller bearing and the axially outer second lateral wall is relatively distant from the roller; and
wherein the base structure has a thickness that is between four and six times the difference between a second diameter defined by the second radius and a first diameter defined by the first radius.

* * * * *